UNITED STATES PATENT OFFICE.

LOUIS BLANGEY, OF MANNHEIM, AND CARL IMMERHEISER, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

AZO DYE.

1,073,951.     Specification of Letters Patent.     Patented Sept. 23, 1913.

No Drawing.     Application filed May 28, 1913. Serial No. 770,332.

*To all whom it may concern:*

Be it known that we, LOUIS BLANGEY and CARL IMMERHEISER, citizens, respectively, of the Swiss Republic and of the German Empire, residing, respectively, at Mannheim and Ludwigshafen-on-the-Rhine, Germany, have invented new and useful Improvements in Azo Dyes, of which the following is a specification.

We have discovered that azo coloring matters which are specially suitable for use in the form of lakes can be obtained by combining a diazo compound free from sulfonic acid, carboxylic acid and hydroxyl groups with a chlorinated benzoyl-1.8-amino-naphthol-4.6-disulfonic acid which contains at least one chlorin atom in the benzene nucleus. In the form of their lakes, especially the barium lakes, they are generally yellower and more brilliant than those of the non-chlorinated benzoyl compounds. The new coloring matters are characterized by the fact that on gentle reduction with stannous chlorid and hydrochloric acid they give rise to an amino compound free from sulfonic acid, carboxylic acid and hydroxyl groups, and also to an amino derivative of a chlorinated benzoyl-1.8-amino-naphthol-4.6-disulfonic acid containing at least one chlorin atom in the benzene nucleus. The new coloring matters consist, when dry, of from yellow-red to violet powders which yield yellow-red to violet solutions in water and, in the form of their alkaline earth lakes, possess yellow-red to violet shades.

The following example will serve to illustrate further the nature of our invention, which, however, is not confined to this example. The parts are by weight.

Diazotize 127.5 parts of meta-chlor-anilin (which may be done in the usual manner) and run the solution, while stirring, into a solution of 536 parts of the disodium salt of ortho-para-dichlor-benzoyl-1.8-amino-naphthol-4.6-disulfonic acid, to which an excess of sodium carbonate has been added. When the combination is complete, heat the mass to about 80° C. and after adding common salt, if necessary, filter off and press and dry the coloring matter. When dry, it is a scarlet powder which yields a brilliant yellow-red solution in water and in the form of its alkaline earth lakes possesses brilliant blue-red shades. On gentle reduction with stannous chlorid and hydrochloric acid, it gives rise to meta-chlor-anilin and an amino derivative of ortho-para-dichlor-benzoyl-1.8-amino-naphthol-4.6-disulfonic acid.

In a similar manner, coloring matters may be obtained from compounds other than meta-chlor-anilin; for instance from anilin, the toluidins, xylidins, pseudo-cumidin, monochlor-anilin (ortho or para), dichlor-anilins, 6-chlor-2-amino-toluene, anisidins, phenetidins, para-chlor-ortho-anisidin, ortho-chlor-para-anisidin, and alpha-naphthylamin. The ortho-para-dichlor-benzoyl-1.8-amino-naphthol-4.6-disulfonic acid can be replaced by either the ortho-, or the meta-, or the para-, monochlor-benzoyl-1.8-amino-naphthol-4.6-disulfonic acid.

The conversion of the coloring matters into lakes can be effected in any convenient manner.

Now what we claim is:—

1. The new azo coloring matters which can be obtained by combining a diazo compound which is free from sulfonic acid, carboxylic acid and hydroxyl groups with a chlorinated benzoyl-1.8-amino-naphthol-4.6-disulfonic acid containing at least one chlorin atom in the benzene nucleus, which coloring matters consist when dry of yellow-red to violet powders which yield yellow-red to violet solutions in water and in the form of their alkaline earth lakes possess yellow-red to violet shades and which upon gentle reduction with stannous chlorid and hydrochloric acid give rise to an amino compound free from sulfonic acid, carboxylic acid and hydroxyl groups and also to an amino derivative of a chlorinated benzoyl-1.8-amino-naphthol-4.6-disulfonic acid containing at least one chlorin atom in the benzene nucleus.

2. The new azo coloring matters which can be obtained by combining a diazo compound which is free from sulfonic acid, carboxylic acid and hydroxyl groups with ortho-para-dichlor-benzoyl-1.8-amino-naphthol-4.6-disulfonic acid, which coloring matters consist when dry of yellow-red to violet powders which yield yellow-red to violet solutions in water and in the form of their alkaline earth lakes possess yellow-red to violet shades and which upon gentle reduction with stannous chlorid and hydrochloric acid give rise to an amino compound free from sulfonic acid, carboxylic acid and hydroxyl groups and also to an amino derivative of ortho-para-dichlor-benzoyl-1.8-amino-naphthol-4.6-disulfonic acid.

3. The new azo coloring matter obtainable from diazotized meta-chlor-anilin and ortho-para-dichlor-benzoyl-1.8-amino-naphthol-4.6-disulfonic acid, which coloring matter consists, when dry, of a scarlet powder which yields a brilliant yellow-red solution in water and in the form of its alkaline earth lakes possesses brilliant blue-red shades and which upon gentle reduction with stannous chlorid and hydrochloric acid gives rise to meta-chlor-anilin and an amino derivative of ortho-para-dichlor-benzoyl-1.8-amino-naphthol-4.6-disulfonic acid.

In testimony whereof we have hereunto set our hands in the presence of two subscribing witnesses.

LOUIS BLANGEY.
CARL IMMERHEISER.

Witnesses:
J. ALEC. LLOYD,
JOSEPH PFEIFFER.